United States Patent [19]
Gerard

[11] 3,795,373
[45] Mar. 5, 1974

[54] AIRCRAFT

[76] Inventor: Andre P. Gerard, 155, rue de la Croix Nivert, 75-Paris 15 eme, France

[22] Filed: July 18, 1972

[21] Appl. No.: 272,973

[30] Foreign Application Priority Data
July 22, 1971 France .............................. 71.26866

[52] U.S. Cl. ................ 244/48, 244/42 D, 244/83 R
[51] Int. Cl. .............................................. B64c 3/38
[58] Field of Search...... 244/44, 39, 45 R, 48, 83 R, 244/83 D, 42 D

[56] References Cited
UNITED STATES PATENTS

| | | | |
|---|---|---|---|
| 2,541,922 | 2/1951 | Hosford | 244/48 X |
| 2,650,047 | 8/1953 | Carhart et al. | 244/44 |
| 2,684,214 | 7/1954 | Perry | 244/48 |
| 2,792,191 | 5/1957 | Perry | 244/48 |
| 2,796,774 | 6/1957 | Peed | 244/83 R |
| 2,912,191 | 11/1959 | Millam | 244/48 |
| 3,385,538 | 5/1968 | Hodges | 244/45 R X |
| 3,415,469 | 12/1968 | Spratt | 244/48 |

Primary Examiner—Duane A. Reger
Assistant Examiner—Barry L. Kelmachter
Attorney, Agent, or Firm—Eric H. Waters et al.

[57] ABSTRACT

An aircraft with a flying surface rotating around an axis perpendicular to the fuselage and statically balanced around said axis. The flying surface has at the rear two flaps symmetrically disposed in relation to the mean longitudinal plane of the fuselage and deflectable in the same direction and by the same angle from the joystick or control column by a movement of the latter corresponding to elevation control. Variable multiplication means are interposed between the joystick and the flaps providing a multiplication ratio increasing in proportion as the flaps are deflected. The horizontal plane of the tail unit is angularly adjustable, which enables the fuselage to retain the desired angle of incidence despite the different distribution of the load within the fuselage.

6 Claims, 4 Drawing Figures

PATENTED MAR 5 1974 3,795,373

AIRCRAFT

PRIOR ART

An aircraft has been proposed, the flying surface or wing of which is rotatably mounted around an axis perpendicular to the mean longitudinal plane of the fuselage and comprising flaps that can be deflected by the pilot in order to modify the incidence of the flying surface in relation to the relative wind. But this flap deflection is operated from a special member, which poses a problem as regards the training of pilots and in particular, as regards the adaptation of pilots accustomed to the system of piloting a conventional aircraft the wing or flying surface of which is not rotatably mounted around an axis perpendicular to the fuselage.

In the known aircraft, the forward and backward movements of the joystick enable the horizontal plane of the tail unit to be adjusted in order to adjust the incidence of the fuselage as a function of its loading distribution. But for a given mode of flight, the joystick remains in a fixed position as regards elevation control, to which the pilot of a conventional aircraft is unaccustomed.

The controls of the known aircraft are more sensitive to low angles of incidence of the flaps, corresponding to high flying speeds than to the higher angles of incidence, which causes some difficulty to persist as regards pilot training.

SUMMARY OF THE INVENTION

The aircraft according to the invention comprises a flying surface rotatably mounted around an axis perpendicular to the mean longitudinal plane of the fuselage and balanced after the fashion of a weathercock around said axis with, at the rear of the flying surface, flaps symmetrically disposed on either side of the mean longitudinal plane. Deflection of these flaps, which determines the angle of incidence of the flying surface in relation to the relative wind, is actuated from the usual joystick by the same movements as those executed for elevation control, a forward movement of the joystick causing, through the aerodynamic action of the flaps, the flying surface to pivot around the rotation axis in a direction diminishing its angle of incidence, which corresponds to a higher aircraft speed, while a backwards movement has the opposite effect. Piloting is thus made easier and rendered almost instinctive and pilot training is more rapid.

In addition, the transmission between the joystick and the incidence flaps of the flying surface rotatably mounted on the fuselage introduces a variable multiplication factor, the multiplication factor being greater for high incidences of the flying surface to which corresponds a low aircraft speed than for low incidences to which corresponds a high aircraft speed. The well-known difficulty in pilot training resulting from the extreme sensitivity of elevation control for high aircraft speeds is thus avoided.

The invention provides for the horizontal plane of the tail unit to be adjusted by manipulating a control device other than the joystick, which enables the fuselage, whatever its loading distribution, to assume a position for which its axis is parallel to the relative movements of the aircraft and the air, so that, in all cases, the aerodynamic resistance it presents to forward movement is minimal.

The trajectory of the aircraft in relation to the air is materialized at all times for the pilot, which facilitates piloting, whether by sight or on instruments.

DESCRIPTION OF THE PREFERRED FORMS OF EMBODIMENT

Figure 1:
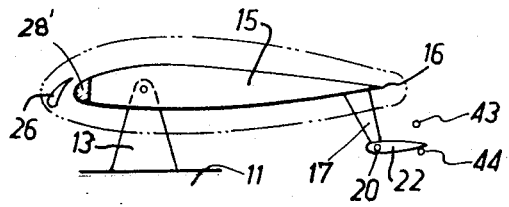
FIG. 1 is a diagram of a flying surface and the adjacent part of the fuselage.
Figure 2:
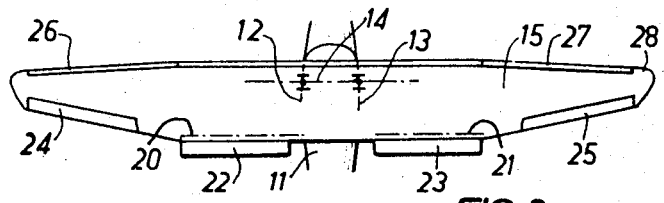
FIG. 2 is a top view of said flying surface.

The aircraft comprises a fuselage 11 (FIGS. 1 and 2), on which are erected two supports 12 and 13 between which is disposed an axis or pivot 14 around which a flying surface or wing 15 is rotatably mounted.

In an alternative form, the wing is in two parts, mounted on either side of the fuselage and rotatably integral in relation to the latter.

Means, schematically represented at 57, enable the wing to be locked in its rotary movement if necessary, for example when the aircraft is travelling over the ground and when the wind is violent.

Near its trailing edge 16, on either side of the fuselage 11, strut elements 17 support at their extremity, in rotation around pins 20 and 21, flaps 22 and 23. The wing comprises the usual warping flaps 24 and 25 and, if need be, high-lift flaps 26 and 27 fitted to the leading edge 28. A balancing element 28' may be provided at the front of the wing, near its leading edge.

Figure 4:
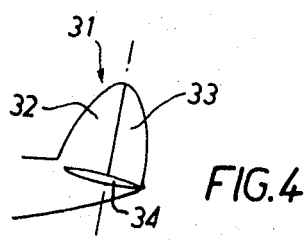
FIG. 4 is a view of the rear part of the fuselage.

On its rear portion, the fuselage 11 has a tail unit 31 (FIG. 4) with a vertical fixed plane 32 and a rudder 33 as well as a horizontal fixed plane 34, generally without an elevator plane.

Figure 3:
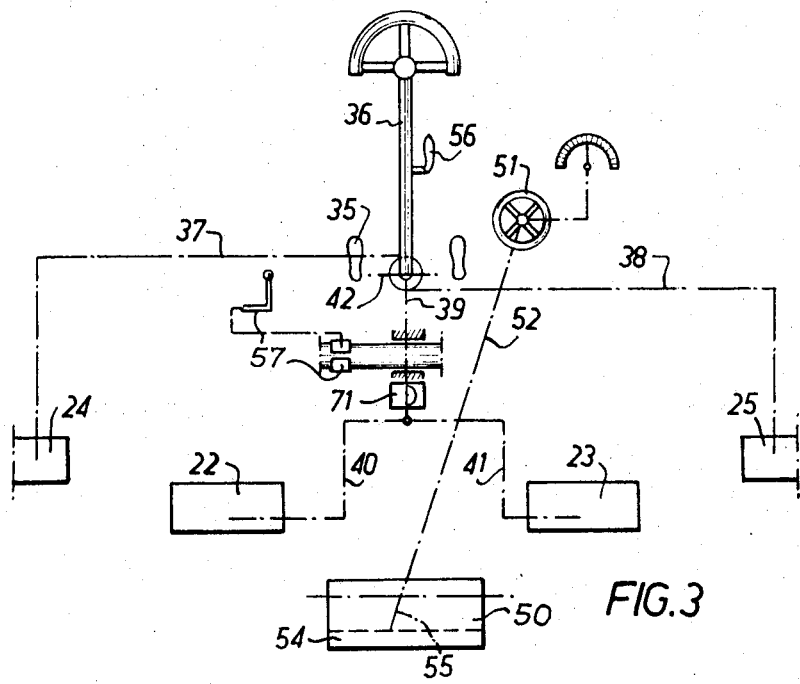
FIG. 3 is a view of the pilot's controls.

Piloting is carried out by means of the usual rudder bar 35 (FIG. 3) and the joystick 36 connected by transmissions 37 and 38 to flaps 24 and 25. A handle or button 56 enables the joystick to be locked as desired in a forward or backward movement. From joystick 36 runs a transmission 39 divided into two arms 40 and 41 ending at flaps 22 and 23. There is no transmission between joystick 36 and plane 34.

During flight, the flying surface 15, mounted so as to rotate freely around axis 14, assumes, after the fashion of a weathercock, a balanced position in relation to the direction of the relative wind, which determines the angle of incidence of the flying surface with respect to the wind, which remains constant as long as the relative position of flaps 22 and 23 is not modified.

To each position of joystick 36, in its backward and forward movement, by rotation around axis 42, corresponds a definite angle of flaps 22 and 23 in relation to the flying surface 15 and, consequently, a determined angle of incidence of the flying surface. To each angle of incidence of the flying surface corresponds an indicated speed.

Stops 43 and 44 are provided, insuring that, during elevation maneuvers of joystick 36, the wing never attains a balance incidence less than that corresponding to the maximum designed speed, nor greater than that fixed of the plane at which and to which stalling occurs.

Piloting an aircraft in accordance with the invention is simple and it may correspond to the reflexes of pilots piloting conventional aircraft.

In particular, on landing, the pilot may, at the moment of touching down, execute the usual elevation maneuver, pulling the joystick toward him.

If preferred, however, he may, leaving the angle of incidence constant, thus without touching the joystick, bring the aircraft back to a horizontal position by increasing the power of the motor.

During an approach, and when it is necessary to fly at a constant indicated speed, it suffices for the pilot to lock the stick in an elevation position corresponding to the indicated speed and to pilot "on power". Conserving the indicated speed leaves the pilot free. It also enables a simplified automatic piloting system to be obtained.

In one embodiment, a variable multiplication device 71 is interposed in the transmission means between the stick 36 and the incidence flaps 22 and 23. The multiplication factor is chosen so that the multiplication is smaller for the low incidences of the flying surface, corresponding to the high speeds of the aircraft, than for the large incidences, corresponding to the low speeds of the aircraft.

By reason of the uniequivocal law of correspondence between the position of the elevation control device and the speed indicated, the variable multiplication device may take the form of a simple cam.

In this way, the main difficulty in training pilots is eliminated by giving elevation control practically constant sensitivity. Here, use is made of the uniequivocal relationship between the position of the stick and the angle of incidence, whatever the position of loads in the fuselage.

During aircraft flight, fuselage 11, which may be considered "hooked" to the flying surface 15, and stabilized in relation to the trajectory by the rear fixed plane 34, automatically orientates itself in relation to the wind, and, for a suitable loading distribution inside the fuselage, the mean line of the fuselage is oriented along the trajectory of the aircraft, the fuselage thus presenting a minimal aerodynamic resistance to the air.

If necessary, adjustment of fixed plane 34 may be modified to take into account different loading distribution. A control element 51 within the pilot's reach is provided for this adjustment and connected to plane 34 by a transmission means 55.

In another embodiment, the horizontal plane 50 of the tail unit comprises a rudder 54 connected by transmission 55 to the control element 51.

Fuselage position may be adjusted, in order for the fuselage to afford a minimal amount of drag. The introduction of a simplified automatic system controlled by a fuselage incidence indicator or detector is also provided for. The incidence of the fuselage may also be displayed in order to facilitate control by the pilot.

In all cases, the materialization of the aircraft's trajectory by the direction of the longitudinal axis of the fuselage provides the pilot with precious information.

The invention applies to aircraft of various types. The advantages that it provides are particularly appreciable in an aircraft designed for very short run take off, or STOL aircraft. In a STOL aircraft according to the invention, the fuselage does not, even on take off, have an elevated trim angle, thus avoiding one disadvantage of known STOL aircrafts.

What I claim is:

1. An aircraft operable by a pilot and comprising: a fuselage having a mean longitudinal plane, a freely rotatable wing, means mounting said wing for rotation as a whole with respect to the fuselage on an axis perpendicular to the central longitudinal plane of the fuselage, said wing being balanced in the style of a wind vane around the said axis, flaps on the rear portion of the wing and symmetrically disposed relative to the said central longitudinal plane, each said flap being rotatably mounted on an axis parallel to said axis, a joystick in said fuselage and a transmission means between said joystick and the said flaps to control, by forward and rearward movements of the joystick, equipollent deflections of the said flaps, and strut means mounting said flaps below said wing.

2. An aircraft as claimed in claim 1, comprising a horizontal tail having a surface rotatably adjustable around an axis transverse to the said central longitudinal plane, an actuating member within reach of the pilot separate from the joystick and adapted for adjusting said surface, and a transmission means between the said member and the said surface of the tail.

3. An aircraft as claimed in claim 2 comprising a fuselage incidence sensor and means for controlling the said actuating member from the said sensor.

4. An aircraft as claimed in claim 1, wherein the transmission means between the joystick and the flaps includes a variable multiplication means operable as a function of the joystick position.

5. An aircraft as claimed in claim 4, wherein the latter said means is such that the ratio of said multiplication becomes greater the greater the deflection of the flaps.

6. An aircraft as claimed in claim 5, wherein the transmission means comprises a cam for varying the multiplication ratio.

* * * * *